United States Patent [19]

Smith

[11] Patent Number: 4,881,601
[45] Date of Patent: Nov. 21, 1989

[54] APPARATUS FOR DEPLOYMENT OF AERIAL-DROP UNITS

[76] Inventor: Wayne D. Smith, 6017 122nd S.W., Tacoma, Wash.

[21] Appl. No.: 195,212

[22] Filed: May 18, 1988

[51] Int. Cl.⁴ .................. A62C 27/30; A62C 28/00; B64D 1/02; F41F 5/02
[52] U.S. Cl. ................... 169/53; 244/136; 244/1 TD; 89/1.54; 89/1.59
[58] Field of Search .............. 169/53, 52, 36, 34, 169/70, 47; 244/136, 1 TD; 89/1.54, 1.59

[56] References Cited

U.S. PATENT DOCUMENTS

| | | | |
|---|---|---|---|
| 1,187,981 | 6/1916 | Doucette | 244/136 X |
| 1,396,894 | 11/1921 | Stevens | 244/136 |
| 2,379,383 | 6/1945 | Steel | 89/1.59 |
| 2,799,421 | 1/1957 | Rust | 169/53 |
| 2,954,948 | 10/1960 | Johnson | 244/136 |
| 3,485,302 | 12/1969 | Thorpe | 169/53 |
| 3,519,080 | 7/1970 | Rochat | 169/53 |
| 3,547,000 | 12/1970 | Haberkorn et al. | 244/136 |
| 3,572,441 | 3/1971 | Nodegi | 169/53 |
| 3,661,211 | 5/1972 | Powers | 169/53 |
| 3,710,868 | 1/1973 | Chadwick | 169/53 |
| 4,158,323 | 6/1979 | Stirrat et al. | 89/1.51 |
| 4,304,517 | 12/1981 | Ulin | 414/412 |
| 4,576,237 | 3/1986 | Arney | 169/53 |

FOREIGN PATENT DOCUMENTS

| | | | |
|---|---|---|---|
| 709294 | 5/1965 | Canada | 169/53 |
| 264232 | 9/1913 | Fed. Rep. of Germany | 89/1.59 |
| 291489 | 4/1916 | Fed. Rep. of Germany | 89/1.59 |
| 347986 | 7/1937 | Italy | 89/1.59 |

Primary Examiner—Joseph F. Peters, Jr.
Assistant Examiner—James M. Kannofsky
Attorney, Agent, or Firm—Glenn D. Bellamy; Delbert J. Barnard

[57] ABSTRACT

Disclosed is an apparatus which carries and selectively deploys aerial-drop units. The apparatus comprises a plurality of substantially parallel tubes, each tube being sized to hold a stack of units and is suspendible from an aircraft by a carrier. Associated with each of the tubes is a releasable unit support element which, upon release, allows a stack of units, as its support is removed, to drop by gravity from the tube.

30 Claims, 9 Drawing Sheets

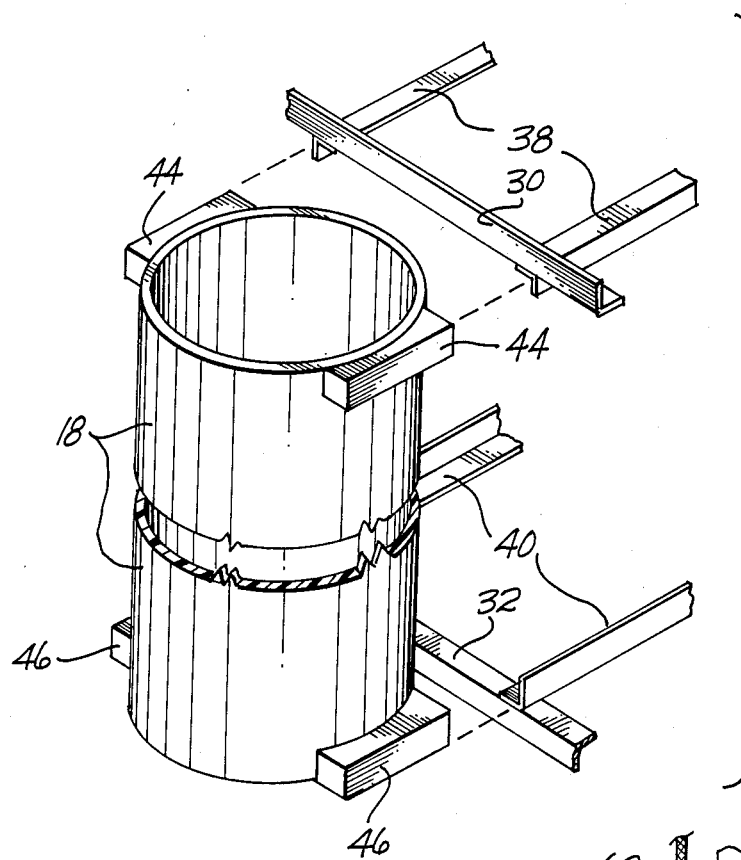
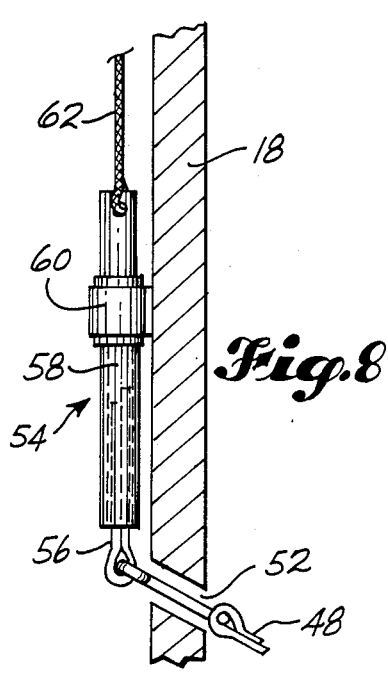
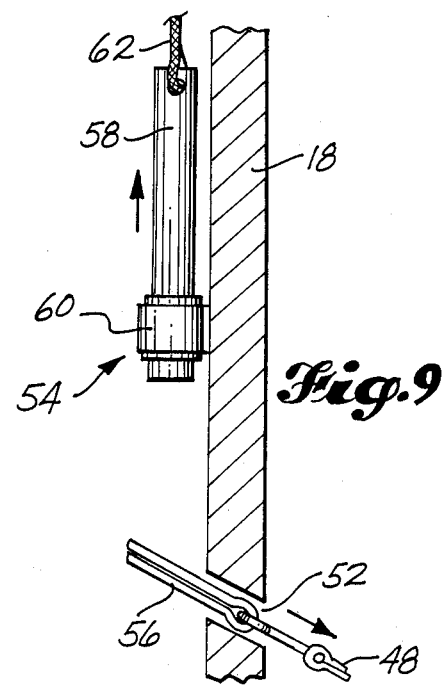

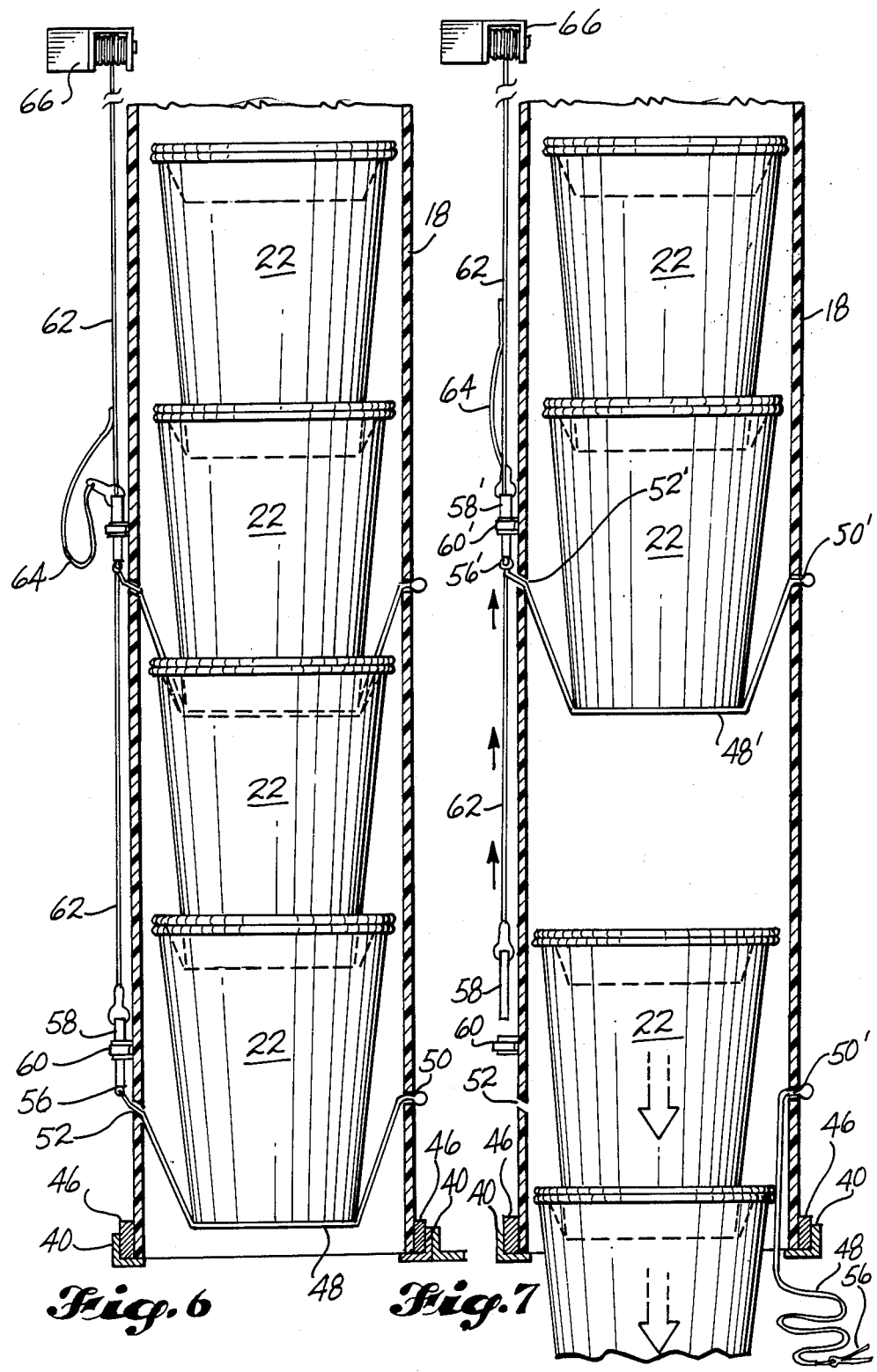

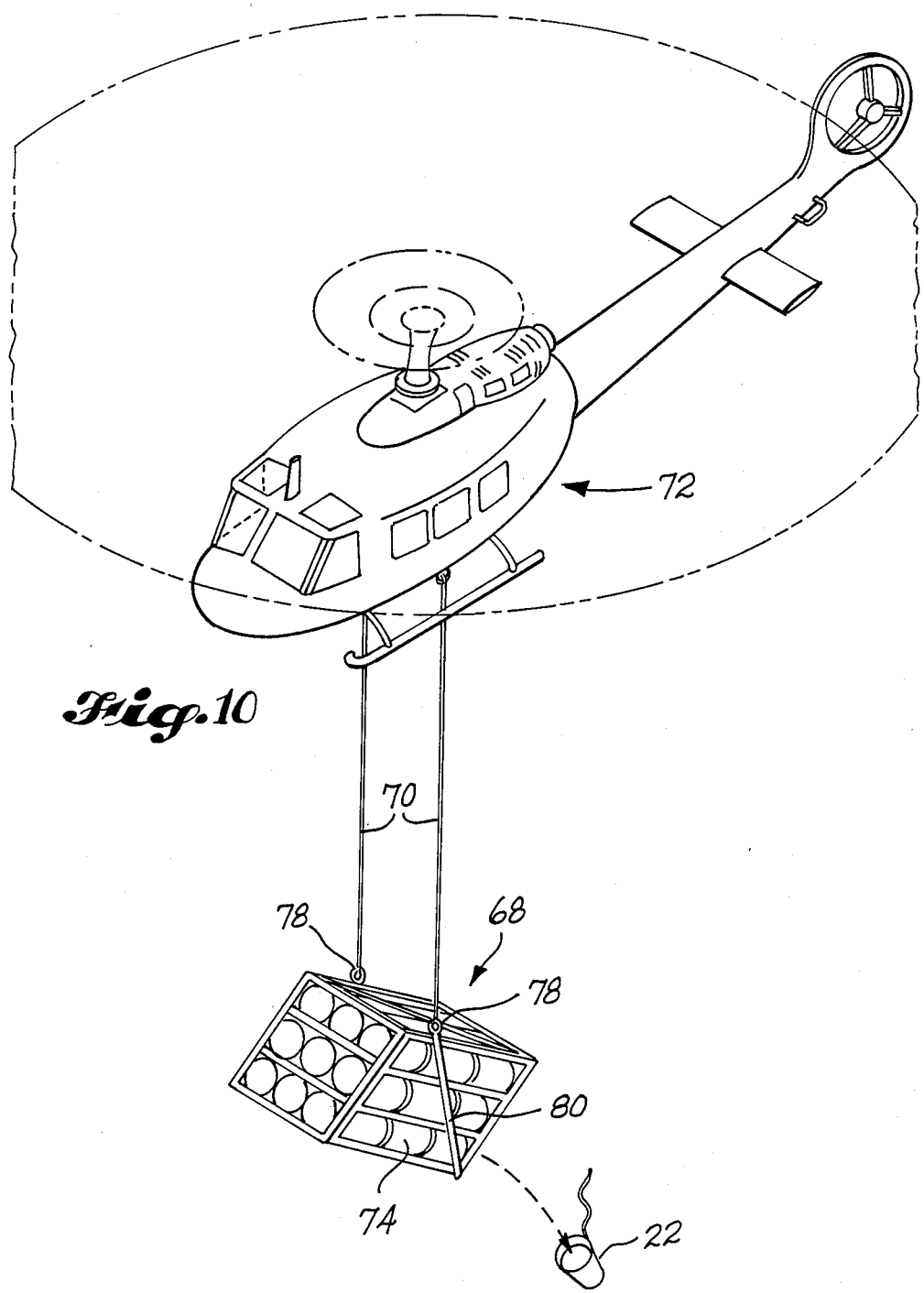

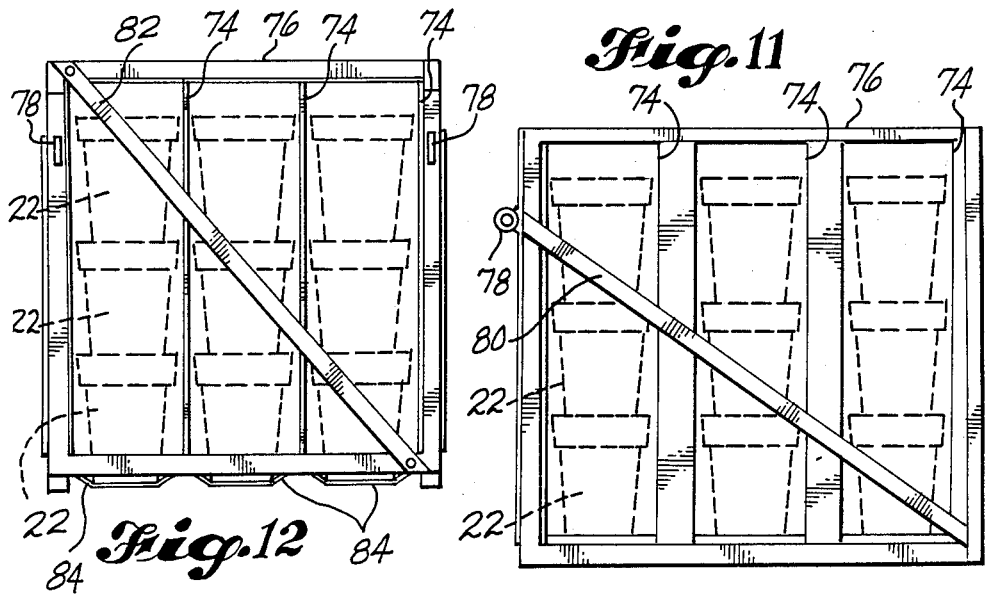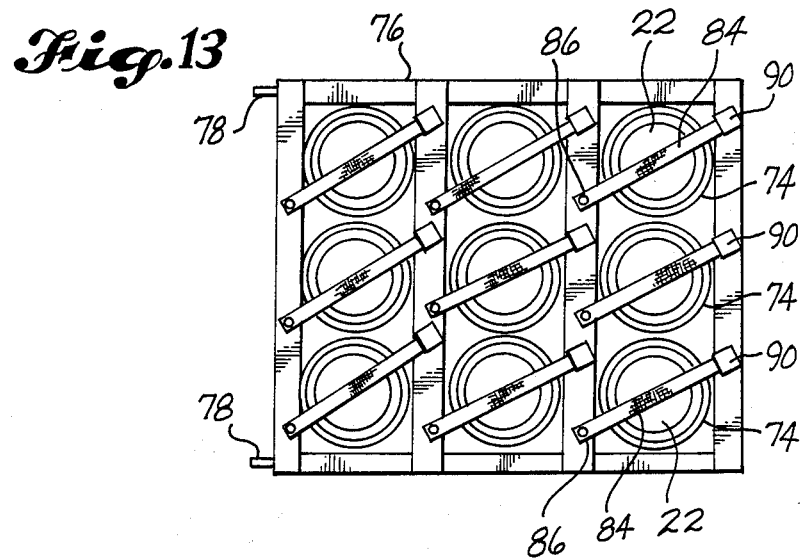

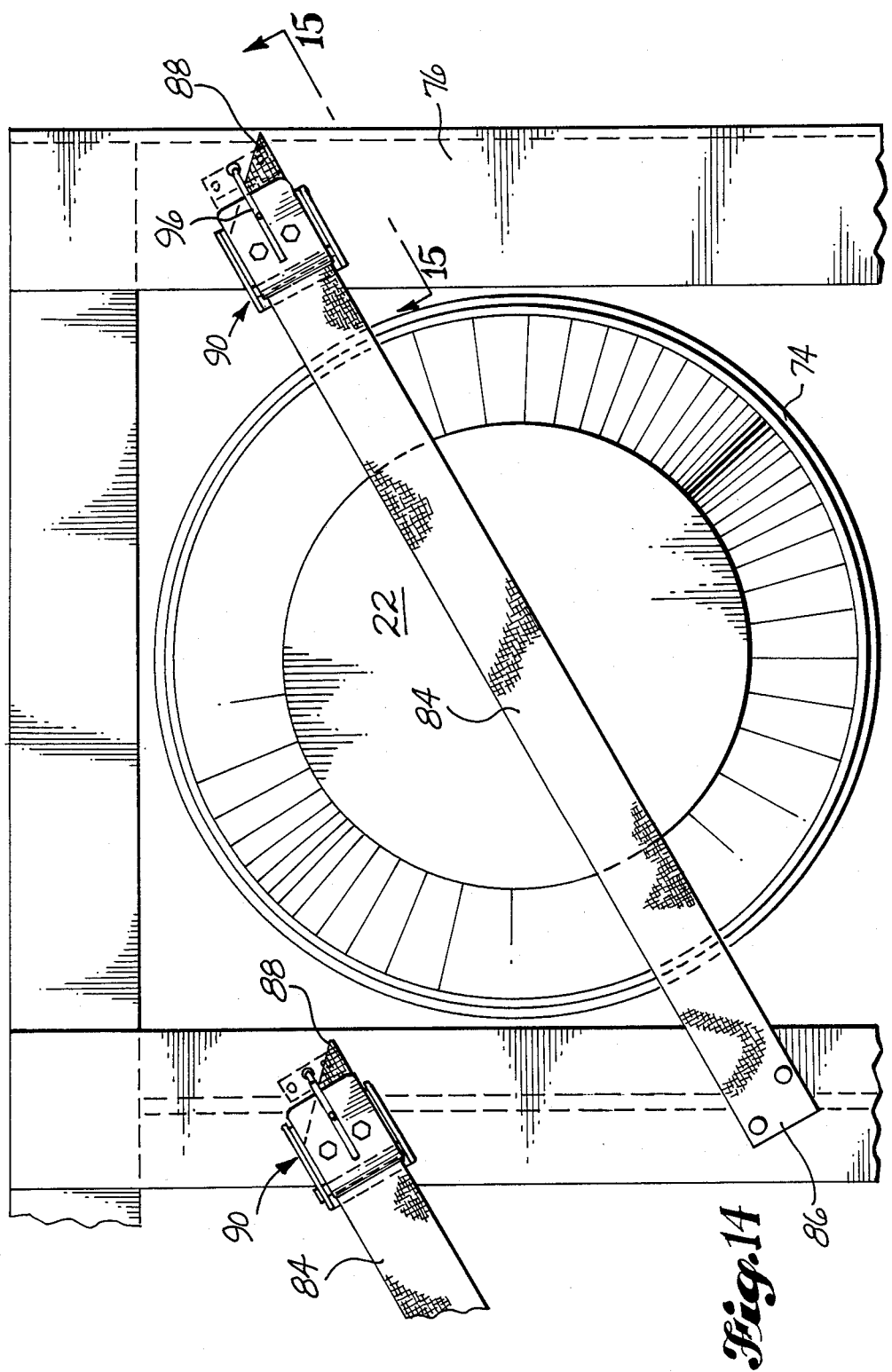

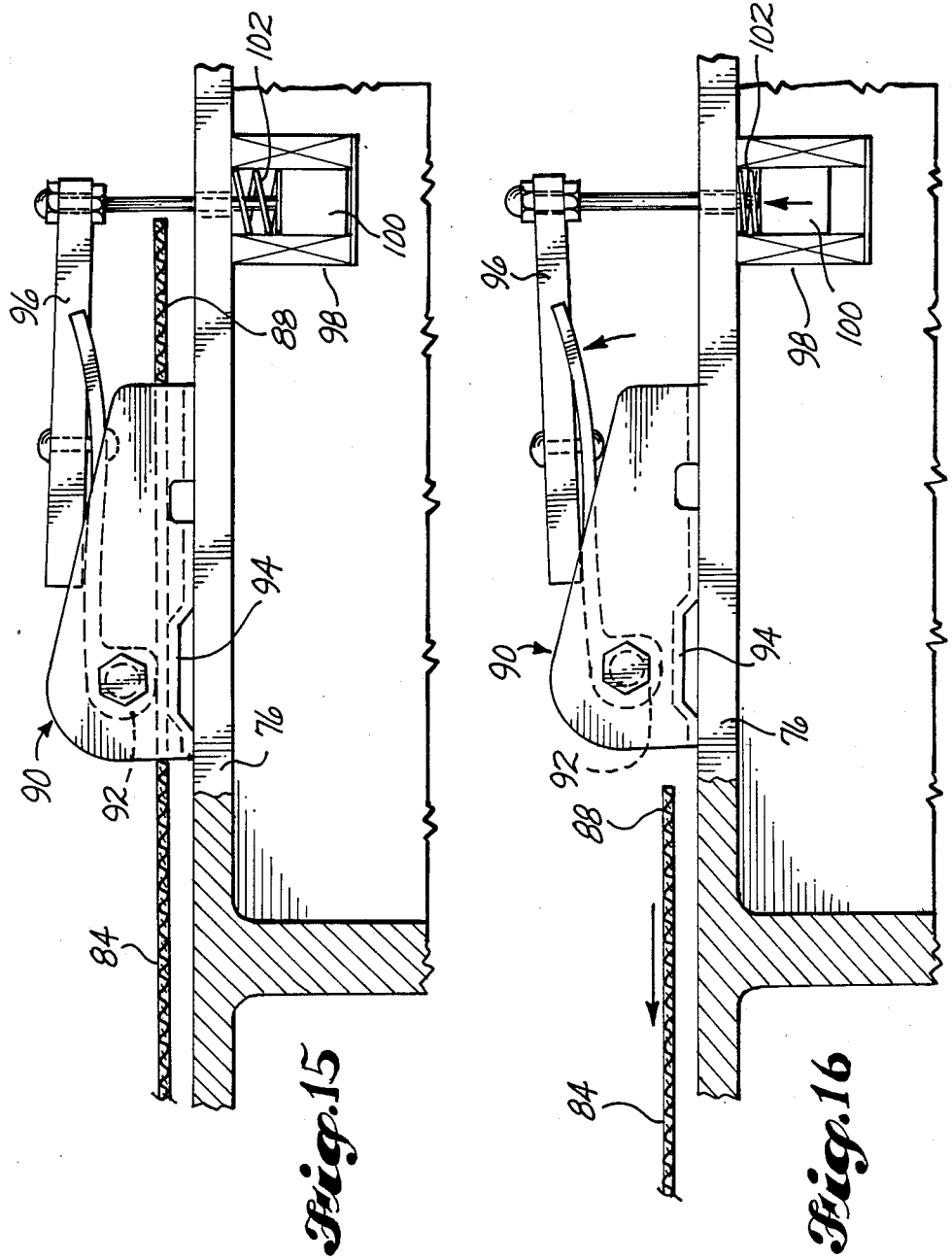

APPARATUS FOR DEPLOYMENT OF AERIAL-DROP UNITS

TECHNICAL FIELD

This invention relates to an apparatus for deployment of aerial-drop units and, more specifically, to an apparatus suspendible from an aircraft which carries and selectively drops fire control devices.

BACKGROUND ART

It is well known in the are to use aircraft for delivery of fire control agents to forest fires or other large-scale fires. U.S. Pat. No. 1,396,894, issued to G. C. Stevens, Nov. 15, 1921, describes an apparatus for air delivery of water to a forest fire by flooding the pontoons of a seaplane while at rest on the surface of a body of water, and then releasing the stored water while flying over the fire area.

It is also well known in the art that high altitude delivery of liquid or powdered fire control agents may have an insignificant effect on fires of great intensity since the fire-controlling agent must be applied at or near the base of the flame to be effective. This limit of efficacy is due to the protective effect of the fire updraft. This shielding effect is described in a report entitled, "High Altitude Retardant Drop Mechanization Study," published Apr. 30, 1973, by the Northern Forest Fire Laboratory, Missoula, Mont.

It is also known in the art that this shielding phenomena may be overcome by containerized aerial delivery of fire control materials. Such containers have a mass great enough to penetrate the updrafts created by a forest fire. The containers then broadcast their payload in the midst of the fire, at or near the base of the flames.

The present invention provides an efficient means of aerial deployment of containerized fire control delivery devices in large quantities.

DISCLOSURE OF THE INVENTION

This invention is an apparatus for deployment of aerial-drop fire control units. A plurality of vertically oriented tubes, each being sized to hold a vertical stack of such units, is supported by a carrier. The carrier allows the entire apparatus to be suspendible from an aircraft, such as helicopter. Within each tube is a releasable unit support element. Also provided is a means for releasing the support element to allow each stack of units within a tube, as its support is removed, to drop by gravity from the tube.

The support element may be a substantially horizontal member extending between sidewalls of each tube. The support element may be pivotally attached at a first end to an inner sidewall of the tube and have a second end releasably attached to a release means at a point substantially diametrically opposed to the first end. The support element may include a flexible strap member and may have at its releasable end a pin member pivotally attached thereto and engageable within a socket member.

The release means may be constructed such that the pin member passes outwardly through an opening formed in a sidewall of the tube to engage within the socket member which is external of the tube. The socket may be slidably mounted within a guide member and have a cable attached to the socket such that the socket may be moved within the guide member by retraction of the cable. Retraction of the socket causes the pin to disengage from the socket, thereby releasing the support element. The cable may be retracted by having an end operably attached to be wound upon a winch. The winch may be powered by an electric motor and controlled from a position remote from the apparatus. More than one support element and releasing means may be provided in each tube such that less than an entire vertical stack of units is released from each tube by the release of a support element.

In an alternative embodiment of the invention, the support element may be a substantially transverse member extending across each tube. The support element may include a flexible strap member attached at a first end adjacent a sidewall of the tube and have a second end releasably attached to a release means at a point substantially diametrically opposed to the first end.

Also in the alternative embodiment, the release means may include a pivoting gripping member capable of engaging the second end of the transverse support element. The release means may also include a stationary gripping member positioned so that the support element may be engaged between the stationary and pivoting gripping members. The position of the pivoting gripping member may be remotely controlled by an electric solenoid.

According to another aspect of the invention, the carrier may include upper and lower guide channels for receiving and supporting the tubes. The lower guide channels include an opening sized to allow downward deployment of the units through lower ends of the tubes. In such an embodiment, the tubes may be slidably insertable into and removable from the guide channels. This feature facilitates refilling the tubes with units after a completed deployment from the apparatus.

According to still another aspect of the invention, the tubes may be substantially cylindrical and have upper and lower pairs of diametrically opposed alignment members situated to prevent lateral and rotational movement of the tubes within the guide channels.

According to yet another aspect of the invention, the carrier may include a harness having a plurality of ends, each end being attached at spaced-apart locations on the carrier and converging upwardly therefrom to an apex. In this manner, the entire apparatus may be suspendible from an aircraft, such as a helicopter, by a single attachment of a line to the apex of the harness. This feature allows rapid exchange of an apparatus depleted of units for an apparatus filled with units, thereby reducing down time of a fire-fighting aircraft to a minimum.

BRIEF DESCRIPTION OF THE DRAWINGS

In the drawings which accompany the description of the invention presented herein, like reference numerals refer to like parts throughout the various views, and wherein:

FIG. 5 is a fragmentary pictorial view of a cylindrical tube having diametrically opposed alignment members at upper and lower ends and insertable into guide channels of the carrier;

FIG. 6 is a cross-sectional view of a tube having two internal support elements each of which retain two fire control units;

FIG. 7 is a cross-sectional view of a tube similar to that illustrated in FIG. 5, wherein the lower support element has been released thereby releasing the support to the vertical stack of fire control units and allowing the units to drop by gravity from a lower end of the tube;

FIG. 8 is a fragmentary cross-sectional view of a tube on which is mounted a preferred embodiment of a pin and socket releasing means in an engaged position;

FIG. 9 is a view similar to FIG. 8 wherein the socket has been retracted thereby releasing the pin;

FIG. 10 is a pictorial view of a helicopter carrying an alternative embodiment of a deployment apparatus;

FIG. 11 is a side view of the alternative embodiment of the apparatus;

FIG. 12 is an end view of the alternative embodiment of the apparatus;

FIG. 13 is a bottom view of the alternative embodiment of the apparatus;

FIG. 14 is an enlarged fragmentary view of the bottom of the apparatus;

FIG. 15 is a fragmentary sectional view of an alternative release mechanism taken substantially along line 15—15 of FIG. 14; and FIG. 16 is a view similar to FIG. 15 except that the release mechanism is in an open position.

BEST MODE FOR CARRYING OUT THE INVENTION

Figure 1:
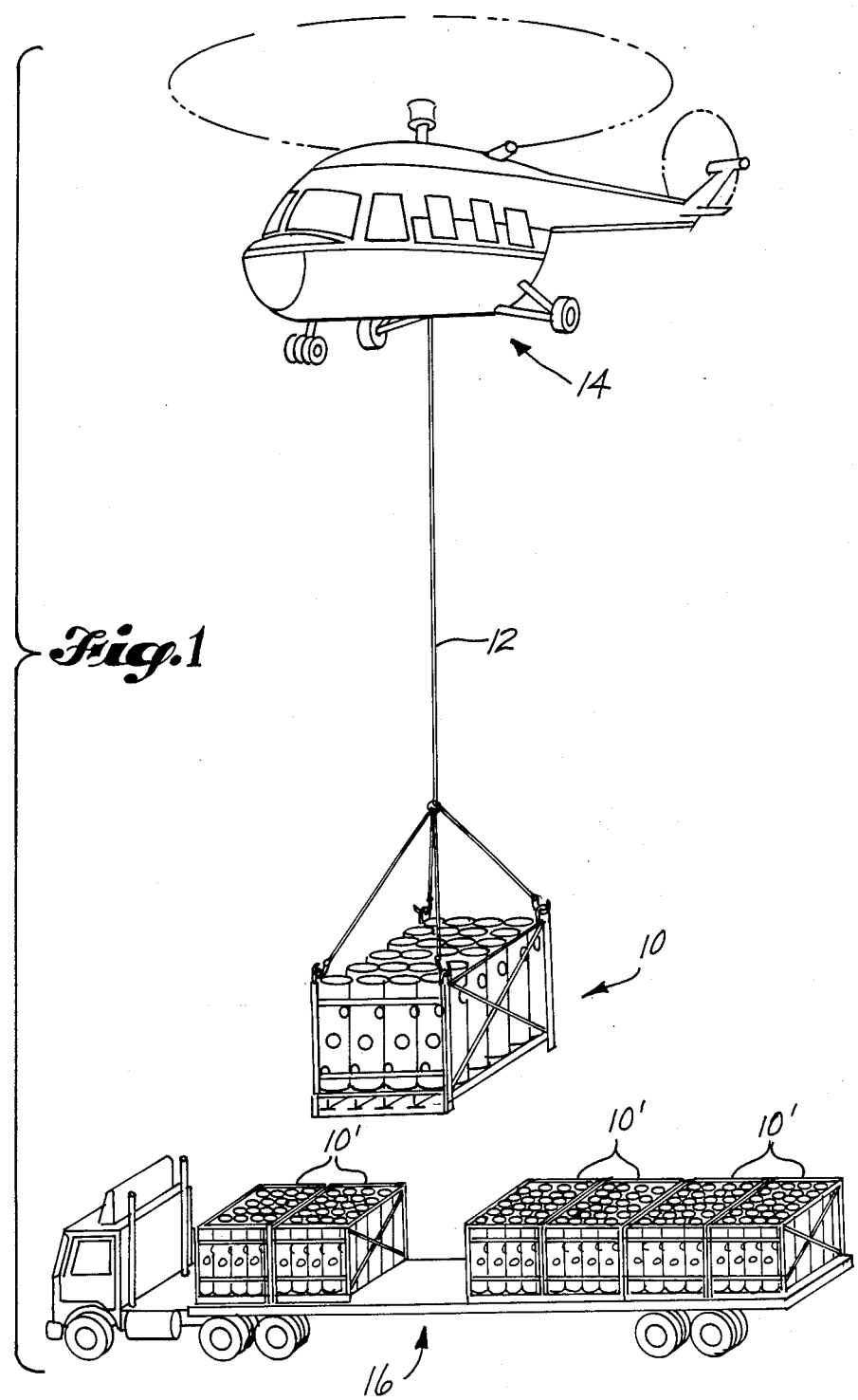
FIG. 1 is a pictorial view of a helicopter lifting a deployment apparatus from the bed of a truck which holds a plurality of such apparatuses.

Referring now to the drawings, and first to FIG. 1, therein is shown at 10 a preferred embodiment of an apparatus for deployment of aerial-drop fire control units suspended by a line 12 from a helicopter 14 hovering above. The deployment apparatus 10 has been lifted from the bed of a truck 16 on which is loaded other similar deployment apparatus units 10'.

Figure 2:
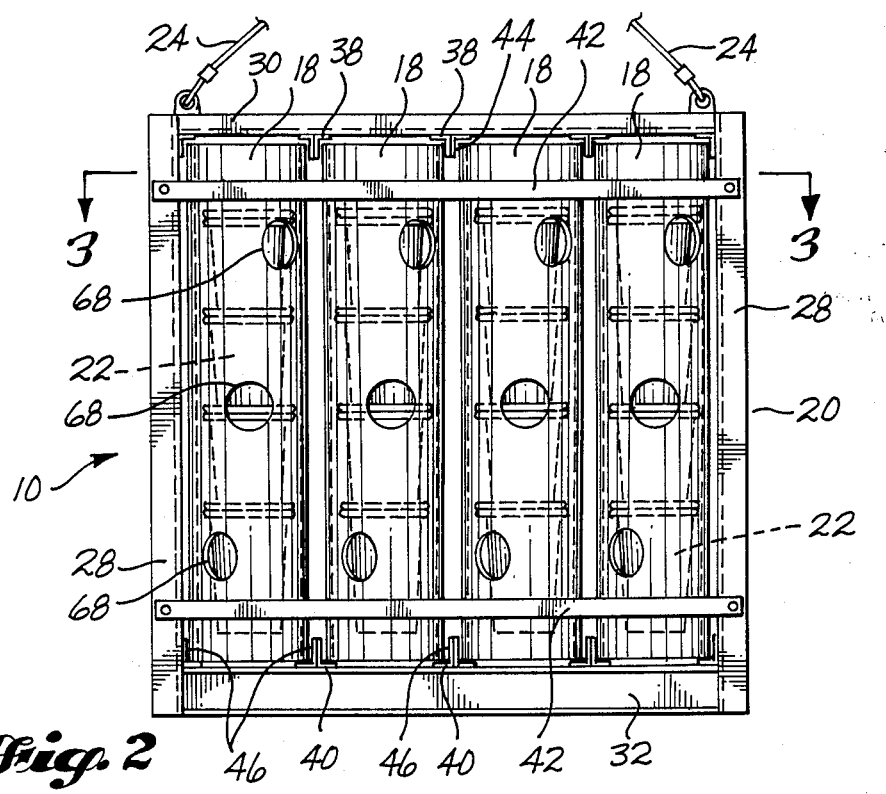
FIG. 2 is a side view of a preferred embodiment of the apparatus.
Figure 3:
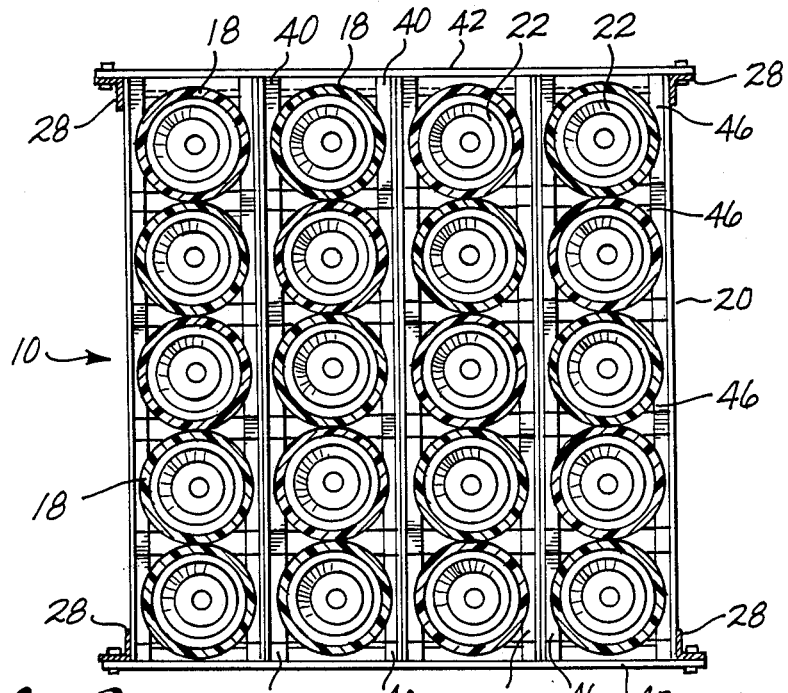
FIG. 3 is a sectional top view of a preferred embodiment of the apparatus taken substantially along line 3—3 of FIG. 2.

Referring now to FIGS. 2 and 3, shown therein is a preferred embodiment of the invention having a plurality of tubes 18 vertically oriented within a carrier 20. The illustrated embodiment of the invention has a total of twenty adjacent tubes 18. Within each tube 18 is shown a vertical stack of aerial-drop fire control units 22. The illustrated embodiment holds a vertical stack of four such units 22 within each tube 18, thereby having a total capacity of eighty such units 22.

Figure 4:
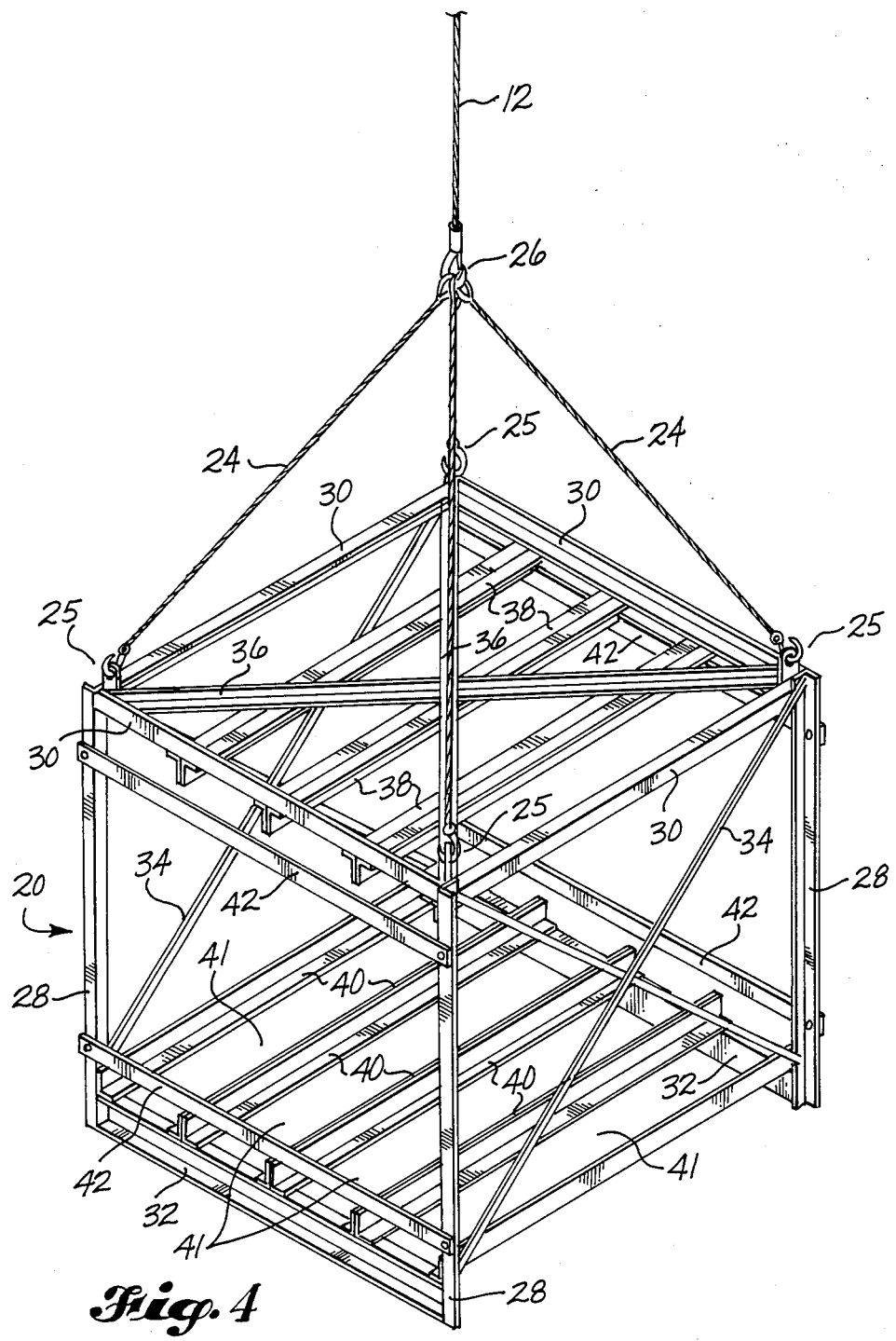
FIG. 4 is a pictorial view of a preferred embodiment of a carrier for the deployment apparatus.

Shown in FIG. 4 is a carrier 20 in preferred form for the apparatus 10. The carrier 20 is shown suspended from a line 12 by a harness 24. The harness 24 is attached to the carrier 20 at spaced-apart locations 25 and converges upwardly to an apex 26. The carrier 20, in preferred form, is substantially a hexahedron, comprising four corner posts 28, upper horizontal members 30 and lower horizontal members 32. Side and top diagonal brace members 34, 36 may be added to provide torsional rigidity to the hexahedral frame.

Also in preferred form, the carrier 20 includes upper and lower channel members 38, 40 for receiving and supporting the tubes 18. The lower guide channels 40 must be spaced apart sufficiently or be provided with an open space 41 such that aerial-drop fire control units 22 may pass downwardly from the tubes 18 between the lower guide channels 40. The guide channels 38, 40 may be in the form of pairs of parallel "L-shaped" angle members to provide lateral and vertical support. A T-shaped member could be substituted for pairs of adjacent L-shaped members. Outer guide channels 38, 40 may serve the dual purpose of being horizontal frame members 30, 32. The tubes 18, after being loaded with fire control units 22, may be laterally slid into the carrier 20 between the upper and lower channel members 38, 40. Side-mounted retention members 42 may be removably mounted to the corner members 28 to hold the tubes 18 in place.

In preferred form, the tubes 18 may be substantially cylindrical in shape and may also have upper and lower pairs of diametrically opposed alignment members 44, 46 situated at upper and lower ends of the tube 18 and sized to slidably engage between upper and lower guide channels 38, 40 so as to prevent lateral and rotational movement of the tube 18 within the guide channels 38, 40. This arrangement is shown in FIG. 5.

Referring now to FIGS. 6 and 7, within each tube 18 there is at least one releasable unit support element 48. In preferred form, the support element 48 is a flexible strap which extends substantially horizontally between sidewalls of the tube 18. The support element 48 has two ends, a first end pivotally attached to a sidewall of the tube 18, such as at 50, and a second end releasably attached at a point substantially diametrically opposed to the first end. The second end of the support member 48 may pass outwardly through an opening 52 in the sidewall of the tube 18. At the second end of the support element 48 is a releasing means which may allow the second end of the support element 48 to fall free, thereby releasing support from the vertical stack of units 22 and allowing the stack of units 22, as its support is removed, to drop by gravity from the tube 18.

Shown in FIG. 6 is a preferred embodiment of the releasable support element 48 within a tube 18. A vertical stack of two fire control units 22 is supported by the releasable support element 48. The support element 48 is attached at one end to a sidewall of the tube 18 at 50. The opposite end of the support element 48 passes outwardly through an opening 52 formed in a sidewall of the tube 18. The opening 52 is substantially diametrically opposed to the attachment 50.

Shown in FIGS. 8 and 9 is a preferred embodiment of a releasing means 54 for a support element 48. Shown in FIG. 8 is a portion of the support element 48 extending outwardly through an opening 52 in the sidewall of a tube 18. Pivotally attached to the support element 48 is a pin 56. The pin 56 is snuggly engageable in a socket 58. In preferred form, the socket 58 is a hollow tube member and is slidably mounted within a guide member 60. When the pin 56 is engaged within the socket 58 the support element 48 places a load on the pin 56 which is substantially nonparallel to the internal bore of the socket 58. This may be accomplished by locating the socket 58 closely adjacent to the opening 52. Additionally, the pin 56 may be frictionally engaged within the socket 58. This frictional engagement may be provided by using a split-shank pin 56 made of resilient material which may be compressed for insertion into the socket 58. A pin 56 in the form of what is commonly known as a "cotter key" provides such properties.

Referring now to FIG. 9, when the socket 58 is retracted within the guide member 60, such as by a cable 62, the pin 56 becomes disengaged from the socket 58. Upon release, the pin 56, directed by the pull of the support element 48, becomes oriented so as to allow the pin 56 to pass inwardly through the opening 52 in the sidewall of the tube 18. As shown in FIG. 7, when the pin 56 is disengaged from the socket 58, the support element 48 is released and the vertical stack of fire control units 22 is allowed to fall by gravity downwardly through an opening in the bottom of the tube 18.

In preferred form, such as is shown in FIGS. 6 and 7, each tube 18 is provided with at least one additional support element 48' located upwardly within the tube 18 such that less than an entire vertical stack of units 22 may be selectively deployed. The secondary support element 48' is attached at one end to an inner sidewall of the tube 18, such as at 50', and at its other end passes outwardly through an opening 52' in the sidewall of the tube 18. As in the embodiment previously described, a pin 56' is pivotally attached to the support element 48' and may be engaged within a socket 58' which is slidably mounted within a guide member 60'.

The same cable 62 may be used to retract both sockets 58, 58'. In such an embodiment, the socket 58' is attached to the cable 62 by a cable extension portion 64. The cable extension 64, such as is shown in FIGS. 6 and 7, is of sufficient length so that the first socket 58 is fully retracted prior to commencement of retraction of the second socket 58'. In this manner, a single cable 62 may be used to selectively retract the sockets 58, 58, The cable 62 ay be retracted by hand or by winding upon a remotely-operated winch 66. A separate winch 66 may be provided for each tube 18 or a single winch 66 may wind the cable 62 of more than one tube 18. In such an embodiment, fire control units 22 may be selectively deployed by using cable extension portions 64 of staggered lengths.

When a plurality of support elements 48 are used within each tube 18 and a plurality of tubes 18 are grouped to be supported by a single carrier 20, access openings 68 may be formed in the sidewalls of the tubes 18 to facilitate loading of each tube 18 with fire control units 22.

Referring now to FIG. 10, shown therein is an alternative preferred embodiment of an apparatus 68 for deployment of aerial drop fire control units 22 suspended by lines 70 from a helicopter 72. A single fire control unit 22 is shown having been deployed from the apparatus 68.

Referring now to FIGS. 11, 12 and 13, shown therein is the alternative embodiment of the invention having a plurality of substantially parallel tubes 74 supported by a carrier 76. The illustrated alternative embodiment has a total of nine adjacent tubes 74. Within each tube 74 is shown a stack of aerial drop fire control units 22. The illustrated embodiments holds a stack of three such units 22 within each tube 74, thereby having a total capacity of twenty-seven such units 22.

The carrier 76 is substantially hexahedral and may be suspended from attachment rings 78. Because the attachment rings 78 are placed at one side of the carrier 76, the tubes 74 become situated at an angle away from vertical when the apparatus 68 is suspended above the ground by support lines 70. Diagonal brace members 80, placed on each side of the carrier 76, extend from about the location of the attachment rings 78 across a side of the carrier 76 in a direction which is substantially vertical when the apparatus 10 is suspended from the attachment rings 78. Other diagonal brace members, such as at 82, may be added to provide tortional rigidity to the hexahedral frame.

Referring now to FIGS. 13 and 14, adjacent a bottom end of each tube 74 there is a releasable unit support element 84. In preferred form, the support element 84 is a flexible strap which extends substantially diametrically across the bottom end of each tube 74. The support element 84 has two ends, a first end 86 attached at or adjacent a sidewall of the tube 74, and a second end 88 releasably attached at a point substantially diametrically opposed to the first end 86. The support member 84 may be located below the lower end of the tube 74 or could pass transversely through respective opposite openings in sidewalls of the tube 74 (not shown). At the second end 88 of the support element 84 is a releasing means 90 which selectively grips or releases the second end 88 of the support element 84. When the first end 88 is gripped by the releasing means 90, the vertical stack of units 22 within the tube 74 will be supported therein by the support element 84. When the second end 88 is released, the support element 84 is allowed to fall free, thereby allowing the stack of units 22, as its support is removed, to drop by gravity from the tube 74.

Shown in FIG. 15 is a preferred embodiment of the releasing means 90 with the first end 88 of the support element 84 engaged therein. The releasing means 90 includes a pivoting gripping member 92 and may include a stationary gripping member 94. In the illustrated embodiment, the pivoting gripping member 92 is in the form of an elongated cam member which provides a frictional engagement of the support element 84, the gripping force of which increases as the load on the support element 84 is increased. The pivoting gripping member 92 could be in the form of one or more tooth members pivotally situated to provide a similar operation. A lever member 96 extends outwardly from the point of rotation of the pivoting gripping member 92. The lever member 96 is extended significantly so that a small amount of lifting force at the outward end of the lever 96 may overcome the relatively large amount of gripping force applied by the pivoting gripping member 92. The position of the lever member 96, and thereby the pivoting gripping member 92, may be controlled by an electric solenoid 98. As shown in FIG. 16, when the solenoid 98 is energized, its plunger 100 is displaced, thereby moving the lever member 96 and rotating the pivoting gripping member 92, allowing the support element 84 to be released. A spring 102 may be used to return the plunger 100 to its original position.

The solenoid 98 of each releasing means 90 may be individually controlled, thereby allowing the contents of each tube 74 to be selectively deployed from a remote position. By using commonly known switching means, the releasing means may be remotely activated individually, sequentially, or simultaneously.

The invention and its attendant advantages will be understood from the foregoing description of typical and preferred embodiments constituting the best mode of the invention known to applicant at the time of filing the patent application. However, it will be apparent from the embodiments, and from the following claims, that various changes may be made in the form, construction, and arrangement of the parts of the apparatus without departing from the spirit and scope of the invention. Accordingly, I do not wish to be restricted to the specific form shown, or to the specific use mentioned, except to the extent that the invention is defined in the following claims.

What is claimed is:

1. An apparatus for deployment of aerial-drop units, comprising:

a plurality of substantially parallel tubes each having upper and lower ends, each said tube being sized to hold a longitudinal stack of said units;

a carrier for said tubes suspendible from an aircraft;

releasable unit support element for each of said tubes; and means for releasing said support elements, allowing each said stack, as its support is removed, to drop by gravity from the tube.

2. The apparatus of claim 1, wherein said carrier includes a harness having a plurality of ends, each end being attached at spaced-apart locations on said carrier and converging upwardly therefrom to an apex.

3. The apparatus of claim 1, wherein said support element is a substantially horizontal member extending between sidewalls of each of said tubes.

4. The apparatus of claim 3, wherein said support element has two ends, a first end being pivotally attached to an inner sidewall of said tube, and a second end releasably attached at a point substantially diametrically opposed to said first end.

5. The apparatus of claim 4, wherein said support element includes a flexible strap member.

6. The apparatus of claim 5, wherein said releasing means includes a pin member pivotally attached to said support element, said pin being engageable within a socket member.

7. The apparatus of claim 6, wherein said socket is slidably mounted within a guide member, a cable is attached at a first end to the socket, and said socket may be moved within, said guide member by retraction of said cable.

8. The apparatus of claim 7, wherein said cable has a second end operably attached to be wound upon a winch.

9. The apparatus of claim 8, wherein said winch is powered by an electric motor, said electric motor being controlled from a position remote from said apparatus.

10. The apparatus of claim 5, wherein said releasing means includes a pivoting gripping member engageable with said support element.

11. The apparatus of claim 10, wherein said releasing means further includes a stationary gripping member operably positioned so that said support element may be engaged between said stationary and said pivoting gripping members.

12. The apparatus of claim 11, wherein the position of said pivoting gripping member may be remotely controlled by an electric solenoid.

13. The apparatus of claim 1, wherein said releasing means includes a pin member pivotally attached to said support element, said pin being engageable within a socket member.

14. The apparatus of claim 13, wherein said pin member and said socket member are external of said tube, said pin member passing outwardly through an opening formed in a sidewall of said tube.

15. The apparatus of claim 13, wherein said socket is slidably mounted within a guide member, a cable is attached at a first end to the socket, and said socket may be moved within said guide member by retraction of said cable.

16. The apparatus of claim 15, wherein said pin, socket, guide member, and cable are located externally of said tube, said pin member passing outwardly through an opening formed in a sidewall of said tube.

17. The apparatus of claim 15, wherein said cable has a second end operably attached to be wound upon a winch.

18. The apparatus of claim 17, wherein said winch is powered by an electric motor, said electric motor being controlled from a position remote from said apparatus.

19. The apparatus of claim 1, wherein said support element is a substantially transverse member extending across each of said tubes.

20. The apparatus of claim 19, wherein said element has two ends, a first end being attached adjacent a sidewall of said tube, and a second end releasably attached at a point substantially diametrically opposed to said first end.

21. The apparatus of claim 20, wherein said support element includes a flexible strap member.

22. The apparatus of claim 21, wherein said releasing means includes a pivoting gripping member engageable with said support element.

23. The apparatus of claim 22, wherein said releasing means further includes a stationary gripping member operably positioned so that said support element may be engaged between said stationary and said pivoting gripping members.

24. The apparatus of claim 23, wherein the position of said pivoting gripping member may be remotely controlled by an electric solenoid.

25. The apparatus of claim 1, wherein said releasing means includes a pivoting gripping member engageable with said support element.

26. The apparatus of claim 25, wherein said releasing means further includes a stationary gripping member operably positioned so that said support element may be engaged between said stationary and said pivoting gripping members.

27. The apparatus of claim 26, wherein the position of said pivoting gripping member may be remotely controlled by an electric solenoid.

28. The apparatus of claim 1, wherein said carrier further includes upper and lower guide channels for receiving and supporting said tubes, said lower guide channels including an opening sized to allow downward deployment of the units through the lower ends of said tubes.

29. The apparatus of claim 28, wherein said tubes are slidably insertable into and removable from said guide channels.

30. The apparatus of claim 29, wherein said tubes are substantially cylindrical and said tubes having upper and lower pairs of diametrically opposed alignment members situated to prevent lateral and rotational movement of said tubes within said guide channels.

* * * * *